April 23, 1935.  C. H. GEMBERLING  1,998,501
TANDEM DISK HARROW
Filed Nov. 15, 1930  2 Sheets-Sheet 1
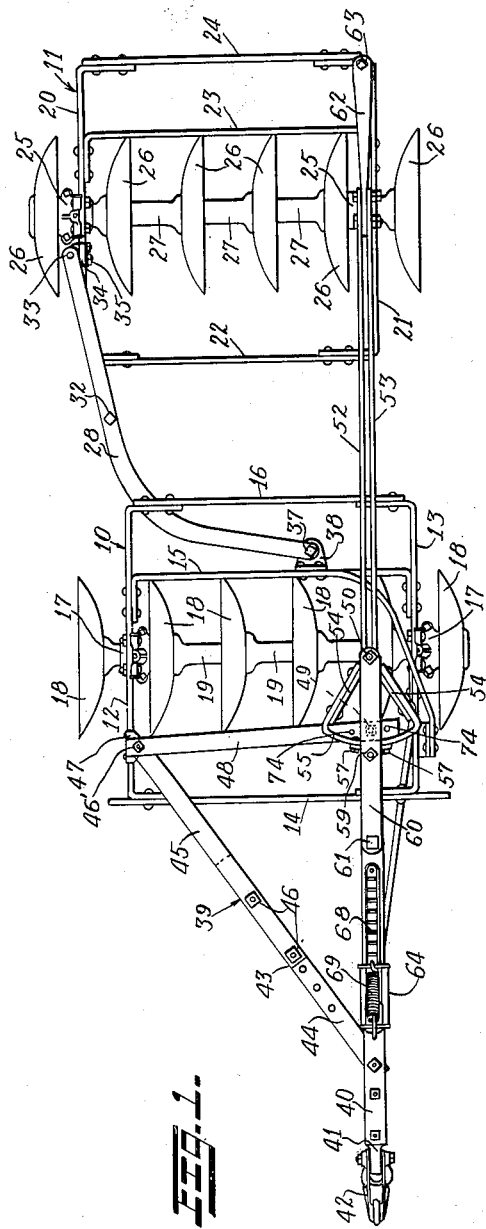
INVENTOR.
Cameron H. Gemberling
BY John P. Smith
ATTORNEY.

April 23, 1935.   C. H. GEMBERLING   1,998,501
TANDEM DISK HARROW
Filed Nov. 15, 1930   2 Sheets-Sheet 2
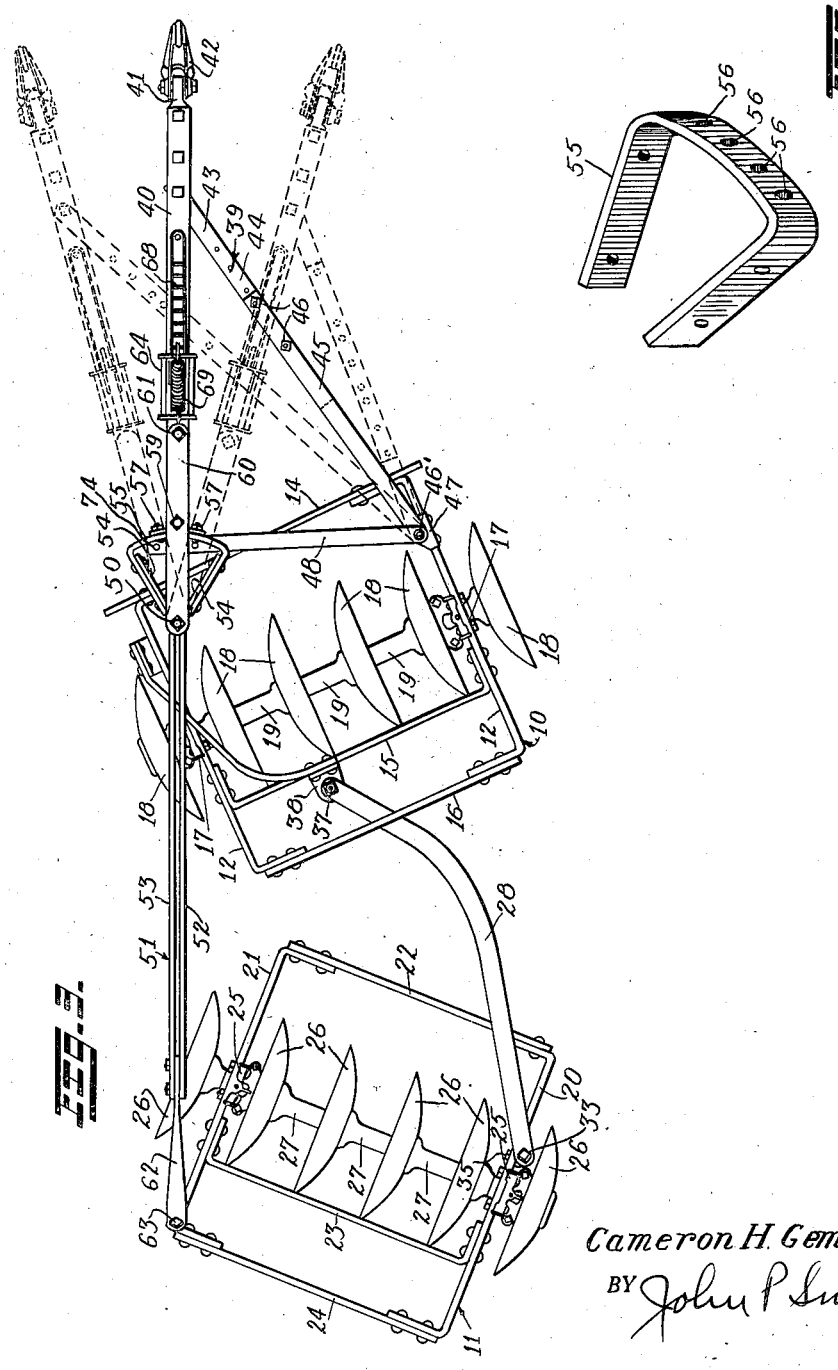
INVENTOR.
Cameron H. Gemberling
BY John P. Smith
ATTORNEY.

Patented Apr. 23, 1935

1,998,501

UNITED STATES PATENT OFFICE 1,998,501

TANDEM DISK HARROW

Cameron H. Gemberling, South Bend, Ind., assignor to Oliver Farm Equipment Company, a corporation of Delaware Application November 15, 1930, Serial No. 495,859

11 Claims. (Cl. 55—33)

This invention relates to a tandem offset disk harrow adaptable to orchard cultivation and so designed that the harrow will travel to one side of the path of the tractor.

One of the objects of the present invention is to provide a novel and improved form of tandem offset disk harrow in which the gangs may be angled with respect to each other to their working angle or return to a parallel position by the draft of the tractor.

A further object of the invention is to provide a novel and improved form of tandem offset disk harrow in which the front draft frame may be adjusted with respect to the front gang frame so that the harrow proper may be adjusted in various offset positions with respect to the longitudinal center of the tractor.

A still further object of the invention is to provide a novel and improved form of tandem offset harrow in which a locking mechanism is provided between the front draft frame and the front gang frame for locking the gang frames in various angular relation or for locking them in their parallel relation with respect to each other.

These and other objects are accomplished by providing a construction and an arrangement of the various parts in the manner hereinafter described and particularly pointed out in the accompanying claims.

Referring to the drawings:

Fig. 1 is a top plan view of my improved offset tandem harrow;

Fig. 2 is a side elevational view of the same;

Fig. 3 is a top plan view of my improved tandem offset harrow with the gangs angled to their normal working angle. This view also shows the draft frame in two different dotted line positions, showing the manner in which the harrow proper may be angled or offset with respect to the line of draft of the tractor; and Fig. 4 is an enlarged perspective view showing the details of the sector which permits the adjustment of the draft frame with respect to the front harrow frame.

The present invention is directed to a simple and efficiently operating tandem offset disk harrow which is adapted primarily for orchard cultivation and is principally designed so that the harrow will travel in various offset positions with respect to the path of travel of the tractor through the medium of an adjustable draft frame which is adjustable with respect to the front gang frame.

The present construction also permits the harrow to be backed with the gangs held in parallel relation into an otherwise inaccessible place in the field, such as in the corner or under a tree, and immediately put the disk gangs into working angle by releasing the latch and pulling the harrow proper forwardly.

In disclosing one embodiment of my invention, I have shown the same in connection with front and rear gang frames generally indicated by the reference characters 10 and 11 respectively. The front gang frame comprises opposite side frame members 12 and 13 which are connected together at their front ends by a forward transverse frame member 14 and two rear transverse frame members 15 and 16. Secured to each of the side frame members 12 and 13 are the usual bearing boxes 17 in which is journaled the usual disk gang shaft (not shown) which in turn, carry the usual concavo convex disks 18, which are held in spaced relation with respect to each other by spacer spools 19.

The rear gang frame similarly comprises two side frame members 20 and 21 which have their forward ends connected by a forward transverse frame member 22 and their rearward ends connected by two transverse frame members 23 and 24. The two side frame members 20 and 21 are provided with the usual bearing boxes 25 in which are journaled a disk gang shaft, (not shown) which in turn has mounted thereon the usual spaced apart concavo convex disks 26 which are held in spaced relation with respect to each other by means of spacer spools 27. The concave side of the front disks 18 extends in the opposite direction to the concave side of the rear disks 26 as is the common practice in this type of a disk harrow. The rear gang frame 20 is flexibly connected to the front gang frame 10 through the medium of a curved link generally indicated by the reference character 28. This curved link member is preferably made of two flat pieces of steel as indicated at 29 and 30 and have their rear portions spaced apart by means of a spacer member 31 which is secured in place by means of a bolt 32. The upper member 29 engages the upper surface of the forward transverse frame member 22 and the side frame member 29, while the lower member 30 engages the lower side of these two side frame members and have their rear ends as shown at 33 pivoted to a U-shaped bracket 34 which in turn is secured by means of bolts 35 to the side frame member 20, of the rear gang frame 11. The forward ends of each of the members 29 and 30 are offset as shown at 36 and pivotally connected by means of a bolt 37 to a downwardly extending L-shaped bracket 38 secured to the rear transverse member 15 of the front gang frame 10. It will be noted that the link 28 is bent or bowed outwardly toward the outer side frame member 12 of the gang frame 10 and is adapted to engage the underside of the rear transverse frame member 16 of the front gang frame for the purpose of preventing the outer disks on the right hand side of the front gang from penetrating the ground too deeply and for maintaining the disks on the same side of the rear gang in proper penetration with the ground.

One of the important features of the present invention includes a novel construction of a pivoted and an adjustable draft frame by means of which the same may be adjusted with respect to the front gang frame so that the disk harrow proper may be offset on either side of the tractor and in different positions with respect to the line of draft. This novel pivoted draft frame also permits the gangs to assume the different working angles and also to assume their normal parallel positions by the draft of the tractor. This novel draft frame comprises a substantially triangular frame construction generally indicated by the reference character 39 and includes a normally longitudinally extending main draft bar 40 which in turn has secured at its forward ends a draft bracket 41 and a draft clevis 42. Connected to the forward portion of the main draft member 40 is an adjustable supplemental draft member generally indicated by the reference character 43. This supplemental draft member 43 consist of a forward flat bar 44 and two spaced apart rear bars 45 by means of which the draft member 43 may be shortened or lengthened by positioning the securing bolts 46 in a series of apertures provided in these members. The bars 45 are positioned on the opposite sides of the front transverse member 14 of the front gang frame so as to limit vertical movement of the draft frame with respect to the front gang frame. The rear ends of the supplemental draft members 45 are pivoted as shown at 46' to a U-shaped bracket 47 secured to the side frame member 12 of the front gang frame 10. Forming a part of the triangular draft frame 39 is a transverse bar 48, which has one end thereof pivoted on the bolt 46' to the bracket 47. The other end of the transverse bar 48 is adjustably secured by means of a bolt 49 to the rearward end and under-side of the main draft bar 40. The bar 48 is provided with spaced apart apertures 74 so that when the draft frame is adjusted to either of the dotted line positions shown in Fig. 3 of the drawings, the bolt 49 may be inserted for securing the bar 48 to the rear end of the draft member 40. It will be noted that the draft member 40, supplemental draft member 39 and transverse bar 48 form a triangular draft frame, all of which are pivoted on the bolt 46' to the front gang frame 10. The rearward end of main draft frame member 40 is pivoted by means of a bolt 50 to a longitudinally extending frame link generally indicated by the reference character 51. The draft link 51 comprises two spaced apart bars 52 and 53 which have their forward ends as shown at 54 diverging outwardly and are secured to an arcuate sector 55. The arcuate portion of the sector 55 is located concentric with the pivot 50 of the main draft member 40. The arcuate portion of the sector 55 is provided with a plurality of apertures 56 for receiving bolts 57 which extend through a clamping bracket 58. The clamping bracket 58 is provided with a vertically extending barrel which is adapted to receive a bolt 59 which extends through the main draft member 40 on an offset bracket 60 which has its forward end thereof secured by means of a bolt 61 to the main draft member 40 and the rearward end thereof pivotally secured by means of the bolt 50. The rearward end of the draft link 51 is provided with a downwardly extending arm 62 which has its rearmost end pivoted by means of a bolt 63 to the rear left hand corner of the rear gang frame 11.

The angling of the gangs is controlled through the medium of a ratchet mechanism which comprises a slidable head as generally indicated by the reference character 64. The head or block is slidably mounted on the main draft bar 40 and is provided at its forward end with a pivoted lever 65 by means of a bolt 66. The upper or free end of the lever is connected by a rope or cord to the operator's seat on the tractor. Formed integrally with the lever preferably on the lower side of the pivot 66 is a pawl 67 which is adapted to engage a plurality of ratchet teeth 68 secured in any well known manner to the upper surface of the main draft bar 40. The lever 65 is normally actuated rearwardly about its pivot for forcing the pawl 67 into engagement with the ratchet teeth 68 by means of an extension spring 69, which has one end thereof connected to the lever and the other end thereof connected to the rear portion of the sliding block 64. Pivoted by means of a bolt 70 to the lower side of the sliding block 64 is a relatively movable supplemental draft member or connection 71 which has its rear end pivotally and loosely connected for horizontal and vertical movement on a bolt 72 secured to two widely spaced and downwardly extending ears of a bracket 73 secured to the side frame member 13 of the front gang frame 10.

From the above description it will be readily seen by referring to Fig. 3 of the drawings that the draft frame 39 may be adjusted to the dotted line position shown in this figure, by removing the bolts 57 and loosening the bolt 59 after which the supplemental draft member 39 may be lengthened or shortened so that the main draft member 40 may assume any of the positions shown in Fig. 3 of the drawings, after which the bolts 57 may be inserted through the clamping bracket 58 for securing the same to the sector 55 and then the bolts 59 may be tightened to rigidly secure the main draft member 40 to the draft link 51. It will also be observed that the right hand end of the bar 48 is provided with a plurality of the apertures 74 for adjustably securing this end of that bar to the rear portion of the main draft member 40 by the bolt 49.

In the operation of my improved tandem disk harrow, let us assume that the gangs are in their parallel positions, or the position shown in Fig. 1 of the drawings and that the operator desires to angle the gangs to their working position, or the position shown in Fig. 3. To make this change, the operator on the tractor, pulls the cord forwardly, thereby swinging the lever forwardly and disengaging the pawl 67 from ratchet teeth 68 and when the tractor moves forwardly, the sliding block 64 together with the draft connection 71 remains relatively stationary, or in other words, swinging the front gang frame 10 rearwardly about its pivot 46' on the front draft frame and at the same time through the medium of the draft link 51 the left hand side of the rear gang frame 11 is pulled forwardly while the right hand side remains stationary or moved rearwardly through the medium of the link 28 which is connected slightly to the left side of the longitudinal center of the front gang frame. When the proper angular working position of the gangs has been assumed, the cord is released by the operator and the pawl 67 on the lever 65 engages the ratchet teeth 68 for locking the same at a proper working angle. In order to straighten the gangs, the tractor may be backed and the gangs will automatically assume their parallel position in a manner reversed from that which they assume their working angle.

While in the above specification I have described one embodiment which my invention may assume in practice, it will of course, be understood that the same is capable of modification and that modification may be made without departing from the spirit and scope of the invention as expressed in the following claims.

What I claim is my invention and desire to secure by Letters Patent is:

1. A tandem disk harrow comprising front and rear gang frames, means for flexibly connecting said front and rear gang frames together, a pivoted draft frame pivoted to one side of the front gang frame, means connected with the other side of the draft frame for forming a rigid connection between said draft frame and the rear gang frame, and operating connection between the front gang frame and said draft frame whereby both of said gang frames may be angled with respect to each other.

2. A tandem disk harrow comprising front and rear gang frames, means for flexibly connecting said frames together, a draft frame pivoted to said front gang frame, a rigid connection between said draft frame and said rear gang frame, a sliding connection between one end of said front gang frame and said draft frame whereby both of said gang frames may be angled with respect to each other.

3. A tandem disk harrow comprising front and rear gang frames, means for flexibly connecting said gang frames together, a draft frame having one side thereof pivoted to the front gang frame and the other end thereof connected by a rigid extension to the rear gang frame, and a movable draft member connecting the front gang frame and adjustably connected to the draft frame whereby both of said gang frames may be angled with respect to each other.

4. A tandem disk harrow comprising front and rear gang frames, means for flexibly connecting said gang frames together, a pivoted draft frame having one side thereof pivoted to the front gang frame, a rearward extension secured to the other side of said draft frame and connected to the rear gang frame, and a slidable connection pivoted to one end of the front gang frame and slidably connected with said draft frame whereby both gang frames may be angularly adjusted with respect to each other.

5. A tandem disk harrow comprising front and rear gang frames, a link for flexibly connecting said front and rear gang frames together, a draft frame pivotally connected to the front gang frame, a connecting bar having one end thereof pivotally connected to the rear gang frame and the other end thereof rigidly connected to said draft frame, a supplemental draft member pivotally connected to the front gang frame, and locking mechanism operatively connecting said supplemental draft member with said draft frame.

6. A tandem disk harrow comprising front and rear gang frames, a link flexibly connecting said gang frames together, a substantially triangular draft frame pivoted to one side thereof to the front gang frame and movable at the other side thereof with respect to the front gang frame, and arched connection rigidly secured to said draft frame for connecting the rear gang frame with the said draft frame, and an extensible locking connection connecting the free end of said draft frame with one end of the front gang frame whereby said gang frames may be angled with respect to each other.

7. A tandem disk harrow comprising front and rear gang frames, a curved link flexibly connecting said gang frames together, a draft frame having one side thereof pivotally connected to one side of the front gang frame and the other side thereof movable relatively to said front gang frame, an arched connecting bar formed as a rigid extension of said draft frame for connecting the rear gang frame with the draft frame, and a longitudinally movable supplemental draft member connected to the front gang frame and adjustably connected to the draft frame whereby the front and rear gang frames may be angled with respect to each other.

8. A tandem disk harrow comprising front and rear gang frames, a link flexibly connecting said frame together, a draft frame movably related to said front gang frame, and a rigid extension of said draft frame for connecting said draft frame to said rear gang frame.

9. A tandem disk harrow comprising front and rear gang frames, a link flexibly connecting said frames together, a draft frame movably related to said front gang frame, a connection rigidly secured to said draft frame and pivotally connected to said rear gang frame, and a movable connection between said front gang frame and said draft frame whereby both of said gang frames may be angled with respect to each other.

10. A tandem disk harrow comprising front and rear gang frames, means for adjustably connecting said gang frames together, a draft frame adjustably connected to said front gang frame, a connection securely fixed to said draft frame and pivotally connected to said rear frame, and a relatively movable connection between the front gang frame and said draft frame whereby both of said gang frames may be angled with respect to each other.

11. A tandem disk harrow comprising a front and rear gang frame, a link flexibly connecting said frames together, a draft frame movably related to said front gang frame, an angularly adjustable member forming a part of said draft frame and connected by a rigid connection to said rear gang frame, a supplemental draft member connecting said front gang frame with said draft frame, and a locking mechanism carried by said draft frame for locking said gang frames in various angular relation with respect to each other.

CAMERON H. GEMBERLING.